US008632209B2

(12) United States Patent
Graeber et al.

(10) Patent No.: US 8,632,209 B2
(45) Date of Patent: Jan. 21, 2014

(54) HYBRID SOURCE LIGHTING SYSTEM

(75) Inventors: Keith E. Graeber, Dixon, CA (US); Michael Olen Nevins, Jackson, MI (US); Michael Jay Siminovitch, Woodland, CA (US); Konstantinos Papamichael, El Macero, CA (US)

(73) Assignees: Full Spectrum Solutions, Jackson, MI (US); The Regents of the University of California, Oakland, CA (US)

( * ) Notice: Subject to any disclaimer, the term of this patent is extended or adjusted under 35 U.S.C. 154(b) by 308 days.

(21) Appl. No.: 13/193,070

(22) Filed: Jul. 28, 2011

(65) Prior Publication Data

US 2012/0026733 A1    Feb. 2, 2012

Related U.S. Application Data

(60) Provisional application No. 61/368,548, filed on Jul. 28, 2010.

(51) Int. Cl.
*F21V 5/00*    (2006.01)

(52) U.S. Cl.
USPC ...................................... 362/231; 362/249.02

(58) Field of Classification Search
USPC ................ 362/227, 231, 249.01, 249.02, 800
See application file for complete search history.

(56) References Cited

U.S. PATENT DOCUMENTS 4,760,502 A * 7/1988 Ackeret ......................... 362/86

\* cited by examiner

*Primary Examiner* — Vip Patel
(74) *Attorney, Agent, or Firm* — Lowe Hauptman & Ham, LLP

(57) ABSTRACT

A lighting fixture system, comprising a first illuminant, a secondary illuminant; and a sensor configured to detect a predetermined condition, the sensor being coupled to the first illuminant and the secondary illuminant, the first illuminant and the secondary illuminant comprising different light sources, the sensor configured to cause modulation of the first illuminant and the secondary illuminant in response to detection of the pre-determined condition.

19 Claims, 17 Drawing Sheets

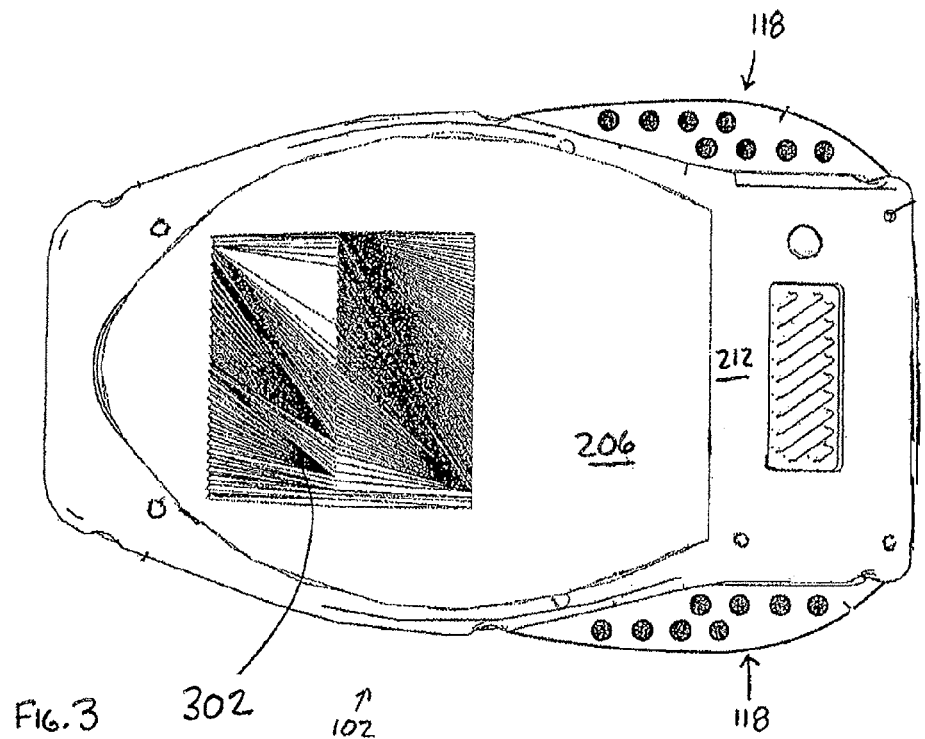
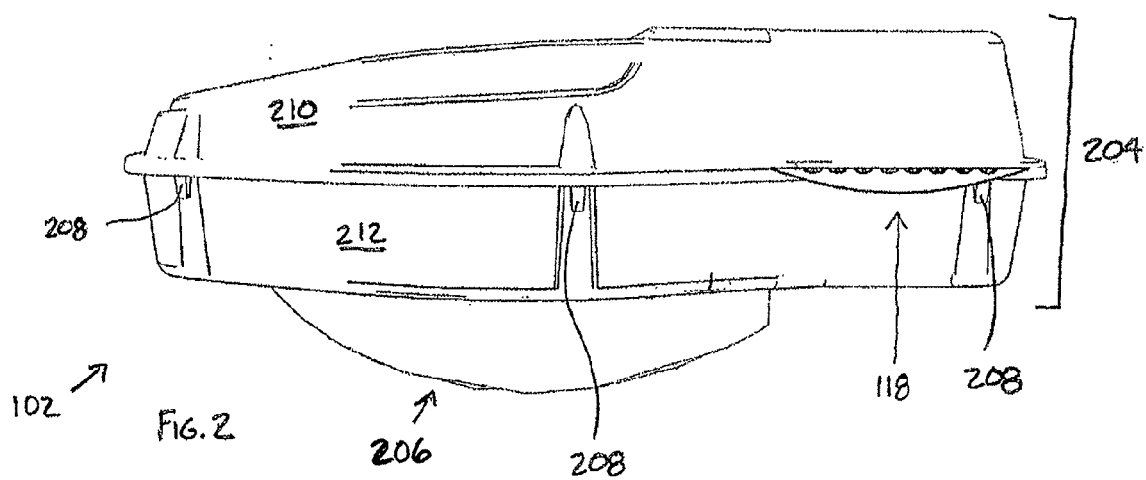

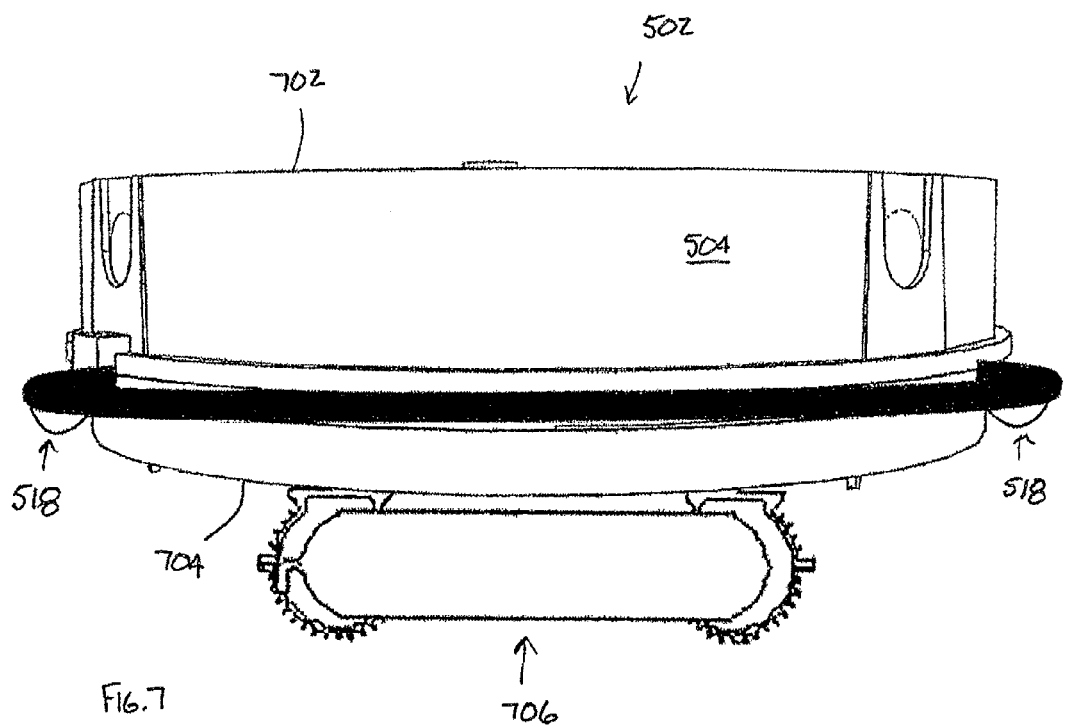

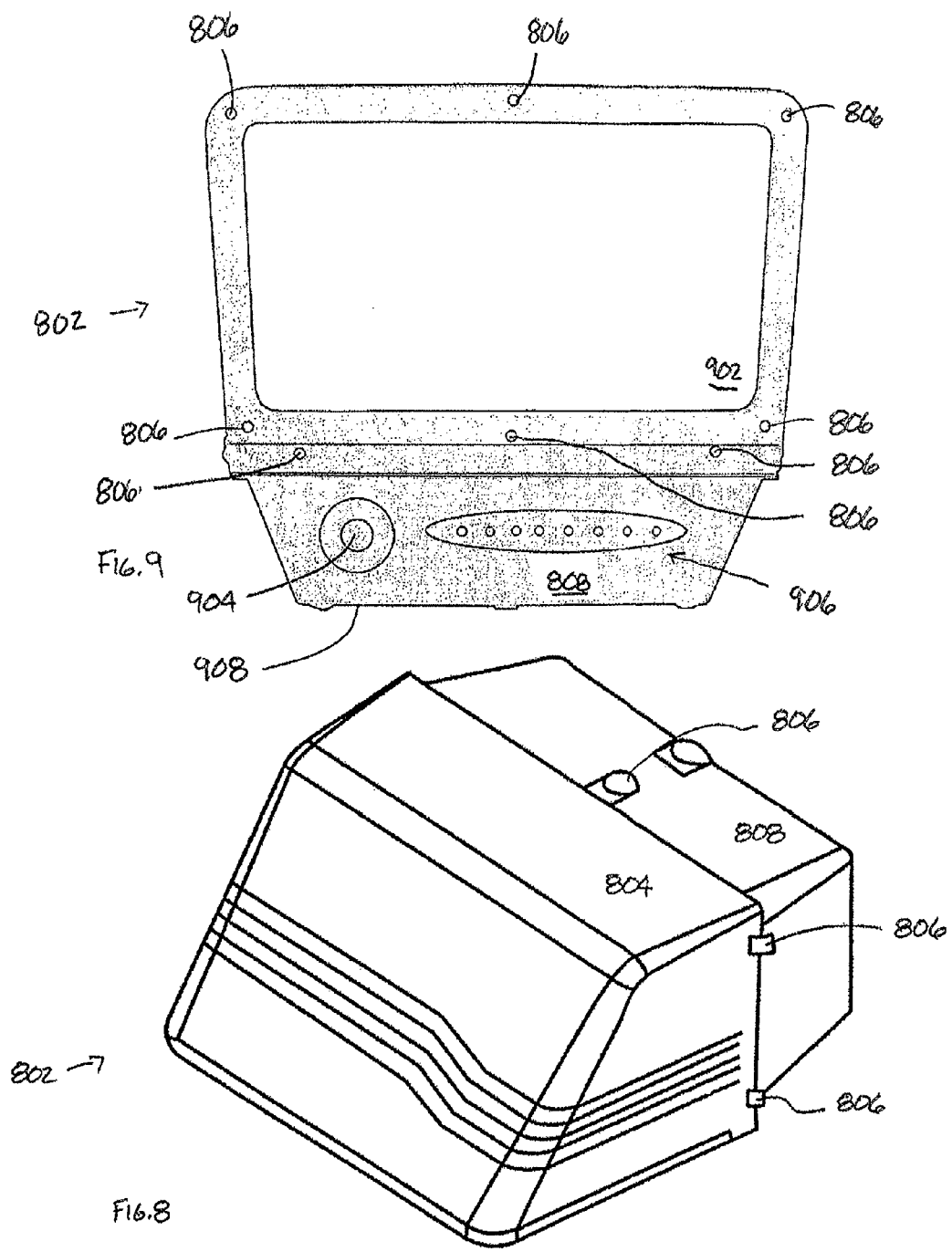

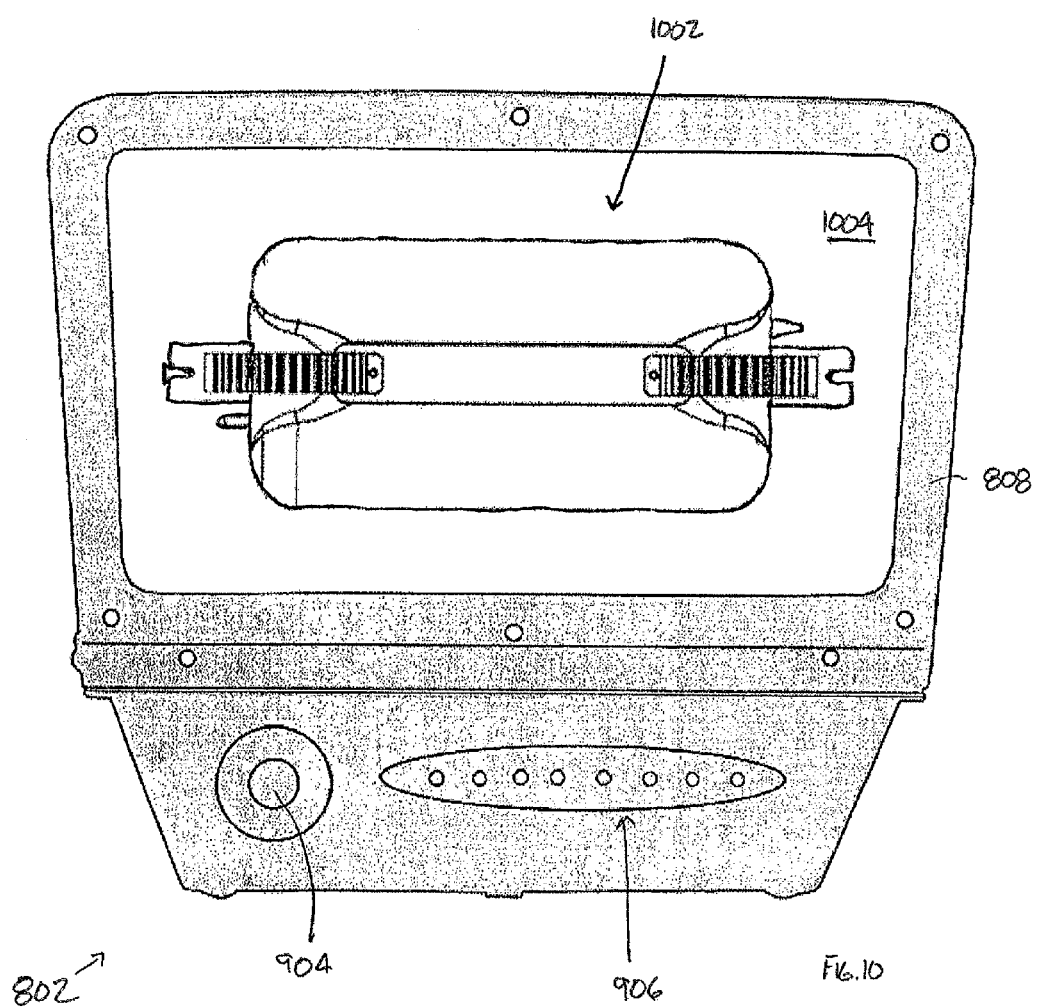

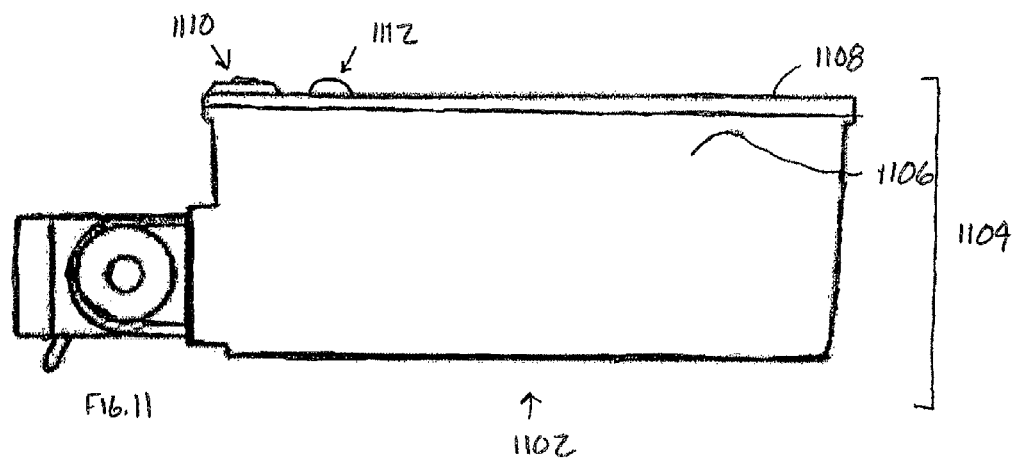
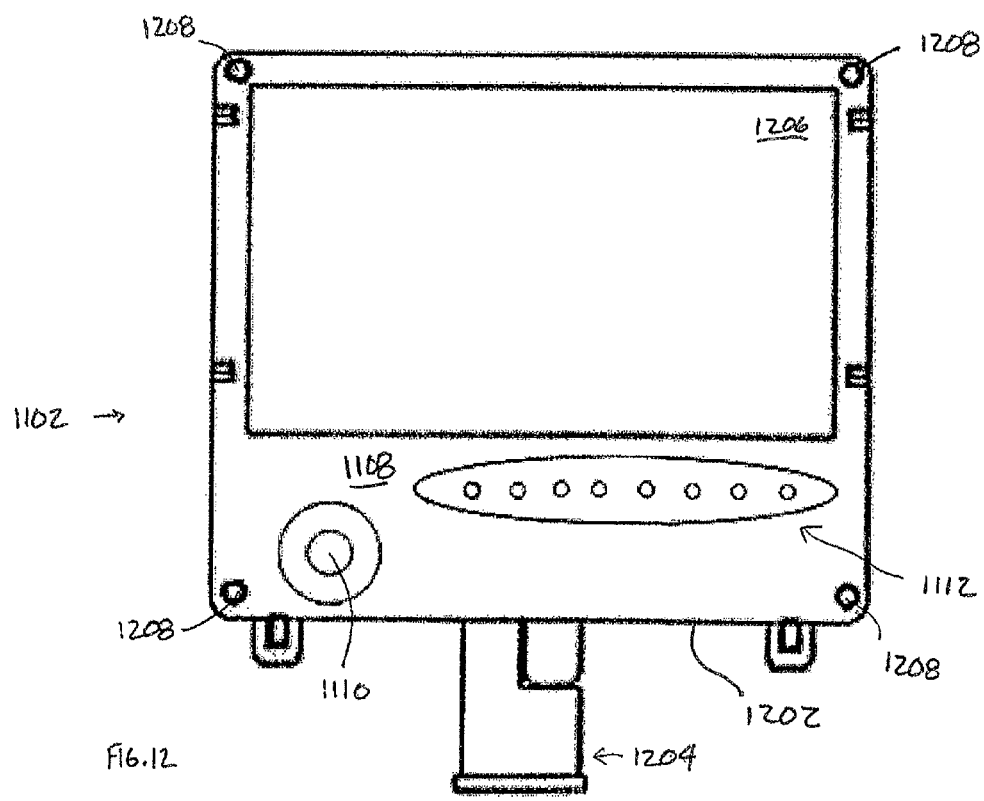

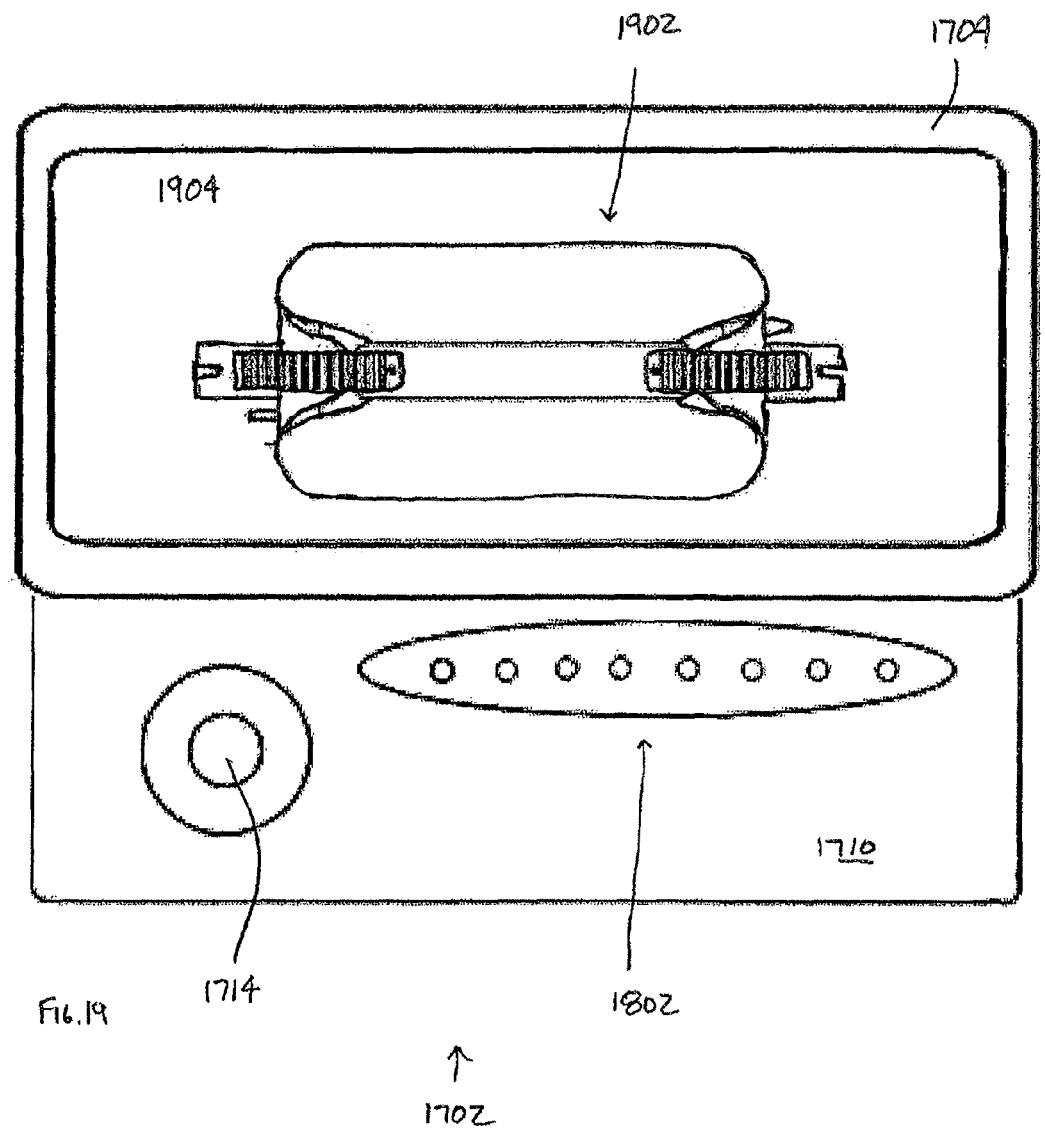

HYBRID SOURCE LIGHTING SYSTEM

BACKGROUND

Traditional bi-level light fixture systems involve the use of a single illuminant that is controlled with Infrared or ultrasonic sensors to reduce the flux output from a high level during occupancy to a predefined reduced level during periods of vacancy. This control technology is typically applied to single or multiple sources of the same spectrum or color temperature characteristic.

There is a growing concern that certain light levels at night may result in biological disturbance or imbalances within certain species due to the hormonal stimulation that occurs with shorter wavelengths corresponding to typical high color temperature light sources. For example, there is growing evidence from the vision science community indicating adverse impacts on humans associated with wavelengths shorter than 500 nanometers (nm) that occur from lighting at night. Studies have shown that human circadian rhythm is mediated by photoreceptors within the eye with a peak response near 450 nm, i.e., typically the blue portion of the visible light spectrum. Exposure to blue light within this critical action spectrum shorter than 500 nm can suppress the normal production of melatonin, a critical hormone that mediates sleep function and other physical responses.

The total amount of light flux entering the sky and disrupting natural wildlife in areas adjacent to the parking and area lighting complexes can have a disruptive effect on wildlife in a similar manner to what is currently being studied with humans.

DESCRIPTION OF THE DRAWINGS

One or more embodiments are illustrated by way of example, and not by limitation, in the figures of the accompanying drawings, wherein elements having the same reference numeral designations represent like elements throughout and wherein:

FIG. 2 is a side view of a shoe box type light fixture according an embodiment of a bi-level hybrid light fixture;

FIG. 3 is a bottom view of the FIG. 2 shoe box type light fixture;

FIG. 7 is a side view of the FIG. 5 garage type light fixture having a lens removed;

FIG. 8 is a side view of the wall pack type light fixture according to an embodiment of a bi-level hybrid light fixture;

FIG. 9 is a bottom view of the FIG. 8 wall pack type light fixture;

FIG. 10 is a bottom view of the FIG. 8 wall pack type light fixture having a lens removed;

FIG. 11 is a side view of the area light type fixture according to an embodiment of a bi-level hybrid light fixture;

FIG. 12 is a bottom view of the FIG. 11 area light type fixture;

FIG. 19 is a bottom view of the FIG. 17 wall pack type light fixture having a lens removed;

DETAILED DESCRIPTION

Some embodiments of the adaptive hybrid source lighting system described herein predominantly emit an amber light at lower level or lower impact light, e.g., during night time hours, and switch over to emitting a wide spectrum for safety and security based on pre-determined conditions, such as occupancy, time, day, and/or emergencies. During periods of vacancy, the lighting fixture responds via an integrated sensor, and switches the hybrid fixture to a secondary source, e.g., lower power secondary source at a significantly lower color temperature, such as, but not limited to, an amber LED.

Amber LEDs emit a dramatically reduced color temperature, which alleviates the potential for biological disturbances resulting from bluer spectrum light sources, while also maintaining safety, security, and comfort during periods of vacancy. Other embodiments use different color LEDs depending on the nature of the intended use, including red, orange, green, and RGB color changing LEDs.

Reduction of the amount of light projected at night within the blue end of the light spectrum alleviates human impact disturbances to people near or adjoining illuminated areas, such as parking lots, parking garages, walkways and the like. The hybrid nature of the lighting system means that for most of the hours of operation typically 50 to 75% of the lighting system will operate outside the blue end of the light spectrum, e.g., in the amber part of the spectrum, at a greatly reduced intensity, away from the critical action spectrum in terms of hormonal response for humans and other mammals and birds.

One or more embodiment described herein also provides the advantage of significant energy savings, while maintaining visual comfort and security within the lighting area. The predominant savings with one or more of the described embodiments occurs by reducing a portion of the power utilized to produce a broad white light source for periods of high demand for white light. During periods of vacancy, the lighting fixture is dramatically reduced and the wavelength generated is shifted to a lower level, e.g., only amber given that no critical tasks are ongoing. Both the reduced power and the shift in spectrum create a significant reduction in energy use.

Figure 1:
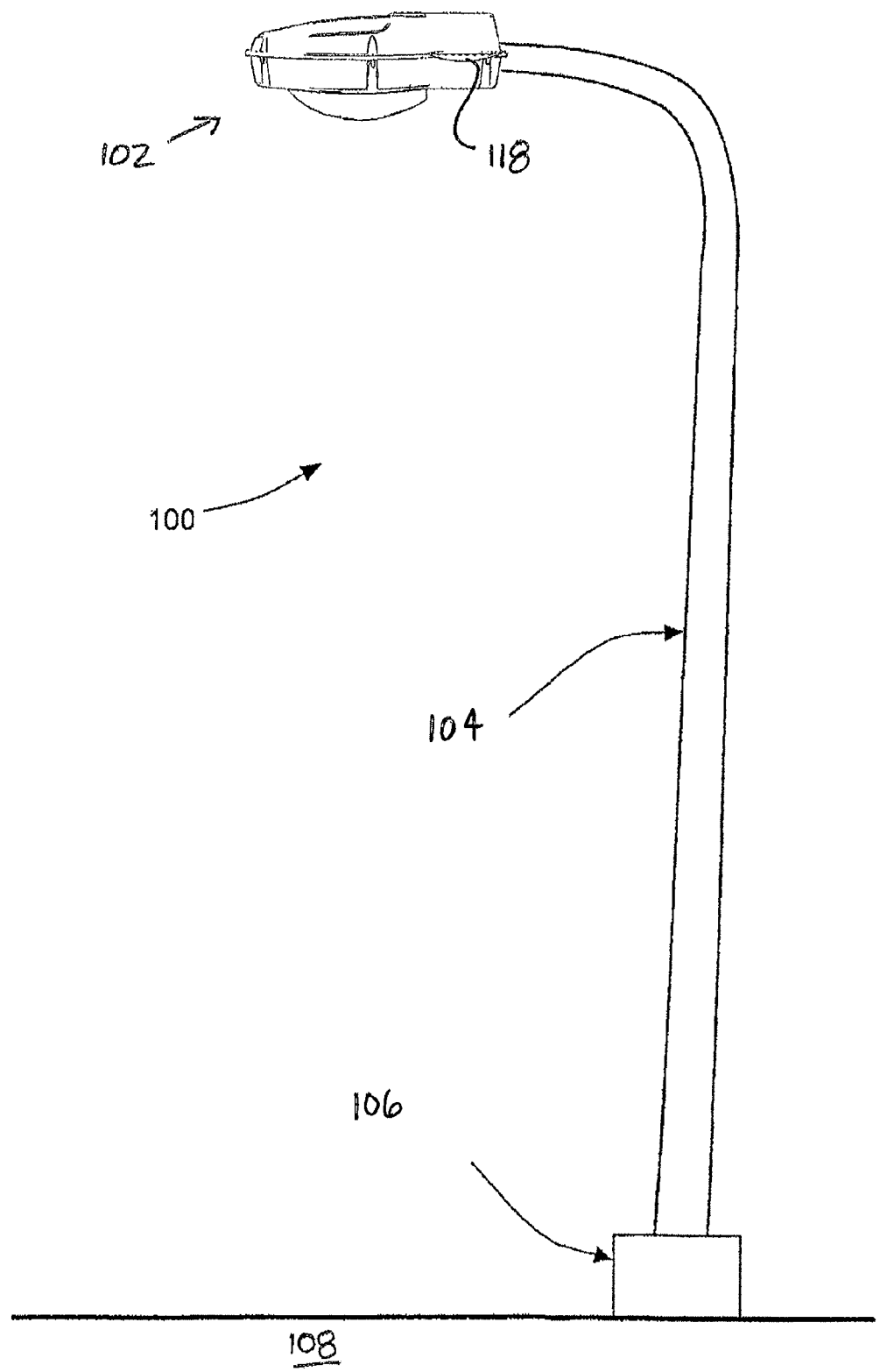
FIG. 1 is a side view of a bi-level hybrid lighting device installed on a surface.

FIG. 1 is a side view of a bi-level hybrid lighting system 100 installed on a surface 108 by way of a pedestal 106. In at least some embodiments, surface 108 comprises ground, roadway, or other supporting surfaces. In at least some embodiments, pedestal 106 comprises any of a number of supportive materials such as stone, concrete, metal, etc.

Bi-level hybrid lighting system 100 comprises a vertically extending support pole 104. In at least some embodiments, support pole 104 extends horizontally or at a different angle in-between horizontal and vertical. In at least some embodiments, support pole 104 is hollow; however, in other embodiments different configurations are possible. In at least some embodiments, support pole 104 is comprised of metal, plastic, concrete and/or a composite material.

In at least some embodiments, support pole 104 also provides a conduit through which electricity is supplied to the light fixture. For example, a connection to a mains or other power source may be provided. In other embodiments, the bi-level hybrid lighting system does not include a pole. Rather, various mechanisms may be used to attach the light fixture directly to a surface other than the ground, such as a wall, concrete structure, building, garage, etc.

The bi-level hybrid lighting device 100 has a shoe box type light fixture 102 connected to the pole 104, according to an embodiment of the present invention. The shoe box type light fixture 102 comprises a first illuminant 402 (FIG. 2) and a secondary illuminant 118. In this embodiment, the first illuminant 402 is a higher power light source than the secondary illuminant 118.

The first illuminant 402 (FIG. 4) is preferably a magnetic induction lamp and powered by an induction-based light source in order to provide increased lifespan and/or reduce a required initial energy requirement for illumination. An induction-based light source does not use electrical connections through a lamp in order to transfer power to the lamp. Electrode-less lamps transfer power by means of electromagnetic fields in order to generate light. In an induction-based light source, an electric frequency generated from an electronic ballast is used to transfer electric power to an antenna coil within the lamp. In accordance with at least some embodiments, first illuminant 402 may have an increased lifespan with respect to other types, e.g., incandescent and/or florescent light sources having electrodes. In accordance with at least some embodiments, first illuminant 402 may have a reduced initial energy requirement for start up of the light source. In at least some embodiments, first illuminant 402 is electrically connected, either directly or indirectly, to a power source.

The lower power secondary illuminant 118 is preferably a light emitting diode (LED), which is powered using a current-regulated AC to DC converter. In another embodiment, the secondary illuminant 118 is an end auction fluorescent coupled with an amber LED. Potential variants on this embodiment would include different spectral outputs of LED including red, amber, green and various combinations. A feature of one or more embodiments is reducing the amount of flux both in terms of intensity and spectrum away from the critical action spectrum at 450 nm. This is achievable with other spectra besides amber such as red LED. Additional embodiments involve different broad-spectrum lights and light sources, including induction, fluorescent, linear fluorescent, compact fluorescent, and other discharge lamps including both low or high pressure.

FIG. 2 is a side view of the shoe box type light fixture 102 according to an embodiment of the present invention. Shoe box type light fixture 102 comprises a case 204 and a lens 206. Case 204 comprises a first housing 210 and a second housing 212. First housing 210 and second housing 212 are removably attached by at least one removable fastener 208. Removable fastener 208 is a threaded screw. In other embodiments, removable fastener 208 includes a compression fitting, nut and bolt, snap fitting or similar fasteners. In yet other embodiments, case 204 is a single unibody construction.

Case 204 is constructed of 80% recycled polycarbonate resin. In other embodiments, case 204 is constructed of metal and/or other plastics.

Second housing 212 is adapted to receive a lens 206 through an opening. Lens 206 is an acrylic lens. In other embodiments, the lens is constructed of clear plastic, glass, or other similar transparent material. In other embodiments, lens 206 is constructed of a partially transparent material. Lens 206 cover the first illuminant 402 (FIG. 4).

FIG. 3 depicts a bottom view of shoe box type light fixture 102. Lens 206 is treated with Type IV prescription 302. In other embodiments, lens 206 is not treated with a prescription.

Figure 4:
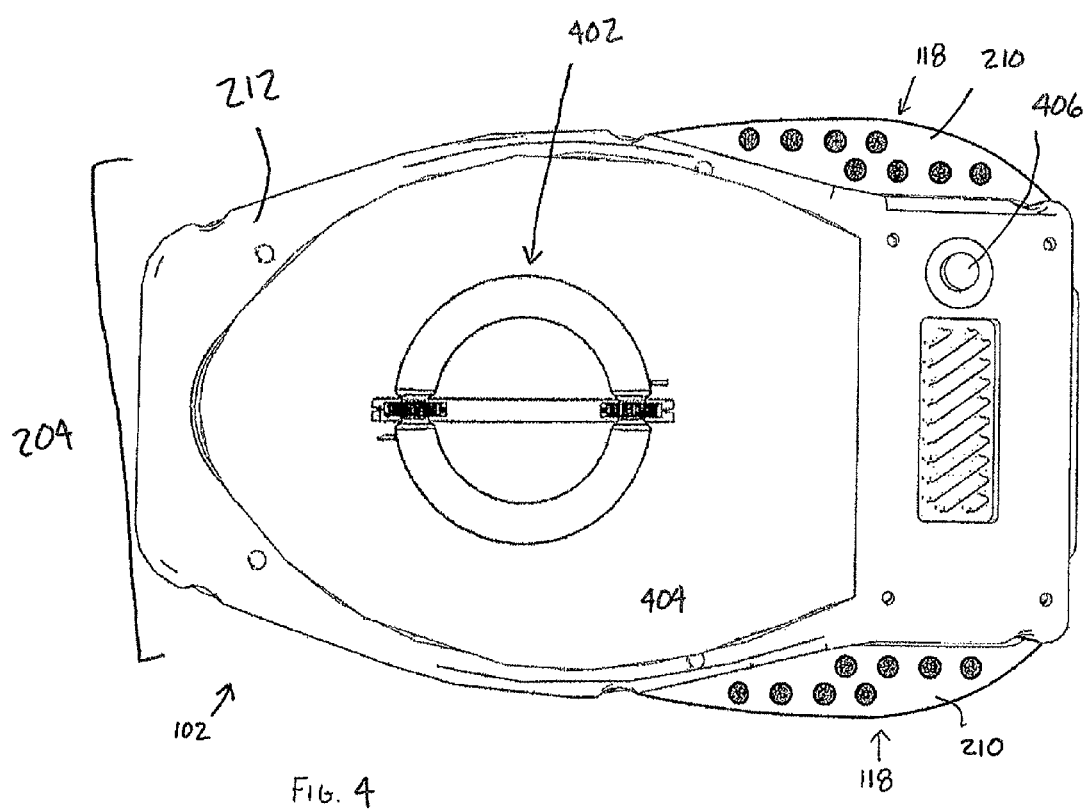
FIG. 4 is a bottom view of the FIG. 2 shoe box type fixture having a lens removed.

FIG. 4 depicts a bottom view of the shoe box type light fixture 102 (FIG. 1), wherein lens 206 is removed from case 204. Case 204 comprises an interior surface 404, which is adapted to receive a first illuminant 402. The first housing 210 of case 204 is adapted to receive a plurality of secondary illuminants 118. In other embodiments, case 204 is adapted to receive a plurality of secondary illuminants 118. In yet other embodiments, second housing 212 is adapted to receive secondary illuminant 118.

A plurality of secondary illuminants 118 is depicted in the shoe box type light fixture 102 (FIG. 1). In other embodiments, a single secondary illuminant is utilized depending on the intensity and desired effects of the secondary illuminant.

A sensor 406 is attached to second housing 212. In other embodiments, sensor 406 is attached to case 204. Sensor 406 is connected, e.g., electrically or communicatively, to first illuminant 402 and secondary illuminant 118. Sensor 406 modulates shoe box type light fixture 102 to emit different spectrums of light or sources of light based on pre-determined conditions, such as occupancy, time, day, and/or emergencies.

Sensor 406 is electrically connected to the induction based light source of first illuminant 402 and the current-regulated AC to DC converter source of secondary illuminant 118. After sensor 406 detects occupancy or presence of a person or being or motion within the lighting application or area, sensor 406 activates the induction based light source thereby powering first illuminant 402. During periods of vacancy, sensor 406 deactivates the induction based light source, and switches the shoe box type light fixture 102 to power the source of secondary illuminant 118 at a significantly lower color temperature, such as, but not limited to, an amber LED.

Sensor technology is determined as appropriate for the application, and may include passive infrared (PIR) and/or Microwave occupancy sensors, as well as ultrasonic sensors. Spectral or source modulation may also be accomplished through a communication network, such as a wired or wireless connection giving a facility manager manual or scheduled access to activate or deactivate the bi-level hybrid lighting device.

This modulation between higher power first illuminant 402, which creates a bluer spectrum of light, and lower power secondary source 118, e.g., an amber LED, significantly alleviates the potential for biological disturbances resulting from the bluer spectrum light sources during periods of vacancy. An additional advantage of this lighting system is that some level of flux is maintained during periods of vacancy maintaining safety, security, and comfort.

In this arrangement, by reducing the spectral power distribution, the bi-level hybrid lighting device reduces the total power consumption and achieves energy savings in at least some embodiments.

Figure 5:
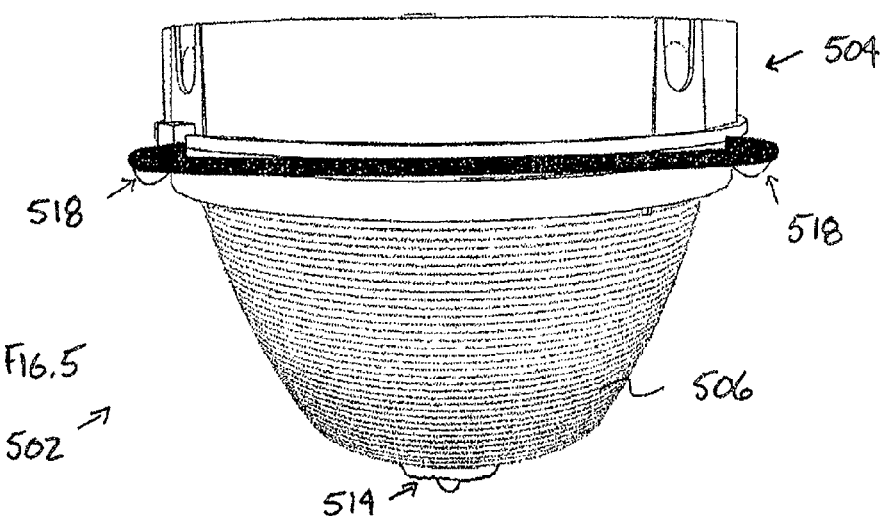
FIG. 5 is a side view of the garage type light fixture according to an embodiment of a bi-level hybrid light fixture.

FIG. 5 is a side view of another embodiment of a bi-level hybrid lighting device having a garage type light fixture 502 according to an embodiment of the present invention. Garage type light fixture 502 comprises a case 504 and a lens 506. Affixed to lens 506 is a sensor 514. Garage type light fixture 502 also has connected to it a secondary illuminate 518.

Figure 6:
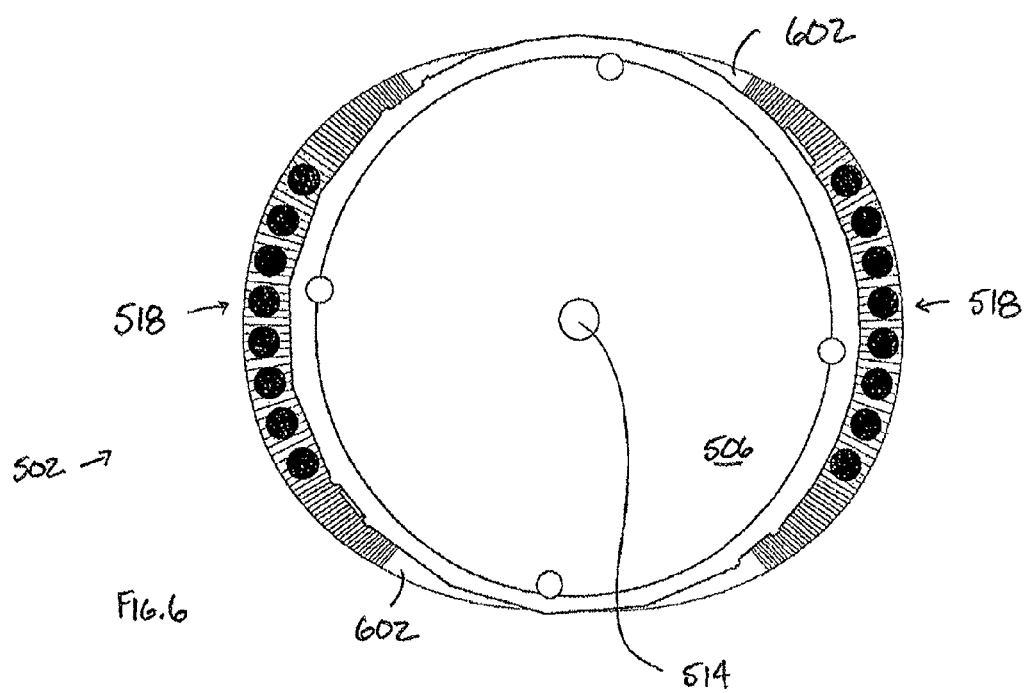
FIG. 6 is a bottom view of the FIG. 5 garage type light fixture.

FIG. 6 is a bottom view of garage type light fixture 502 (FIG. 5). Lens 506 is affixed to case 504 by way of a twist-lock ring. In other embodiments, lens 506 may be affixed to case 504 by way of a fastener or compression fitting.

Case 504 comprises a rim 602 attached to or having attached thereto a plurality of secondary illuminants 518. In other embodiments, a single secondary illuminant is used depending on the intensity and desired effects of the secondary illuminant.

FIG. 7 is a side view of garage type light fixture 502 (FIG. 5), wherein lens 506 is removed to reveal a first illuminant 706 affixed to a surface 704 of case 504.

Garage type light fixture 502 comprises a surface 702. Surface 702 removably attaches to a mountable surface, such as a garage, canopy, parking structure, and adapted to receive a power source to supply power to the first illuminant 706 and secondary illuminant 518.

FIG. 8 is an elevated side view of another embodiment of a bi-level hybrid lighting device having a wall mount type light fixture 802 according to an embodiment of the present invention. Wall mount type light fixture 802 comprises a case 804 and a lens 902 (FIG. 9). Case 804 is removably attached to a housing 808 by fasteners 806.

FIG. 9 is a bottom view of wall mount type light fixture 802. Case 804 is adapted to receive a lens 902. A plurality of secondary illuminants 906 and a sensor 904 are affixed to housing 808. Housing 808 comprises an surface 908, which may be removably attached to a mountable surface, such as a wall of a garage, house, parking structure, and adapted to received a power source to supply power to the first illuminant 1002 (FIG. 10) and secondary illuminant 906.

FIG. 10 is a bottom view of wall mount type light fixture 802, where lens 902 is removed from the wall mount type fixture 802 to reveal a first illuminant 1002 affixed to a surface 1004 of case 804.

FIG. 11 is side view of another embodiment of a bi-level hybrid lighting device having an area light type fixture 1102 according to an embodiment of the present invention. Area light type fixture 1102 comprises a case 1104. Case 1104 comprises a first housing 1106 and a second housing 1108. First housing 1106 and second housing 1108 are removably affixed via fasteners 1208 (FIG. 12). A sensor 1110 and a plurality of secondary illuminants 1112 are affixed to second housing 1108. In other embodiments, the sensor and secondary illumininants are attached to the first housing 1106.

FIG. 12 is a bottom view of area light type fixture 1102. Second housing 1108 of case 1104 is adapted to receive a lens 1206. In other embodiments, first housing 1106 is adapted to receive a lens. Case 1104 comprises an edge 1202 which is removably attached to a mountable surface via a post 1204, such as a wall of a garage, house, parking structure, and adapted to received a power source to supply power to the bi-level hybrid lighting device.

Figure 13:
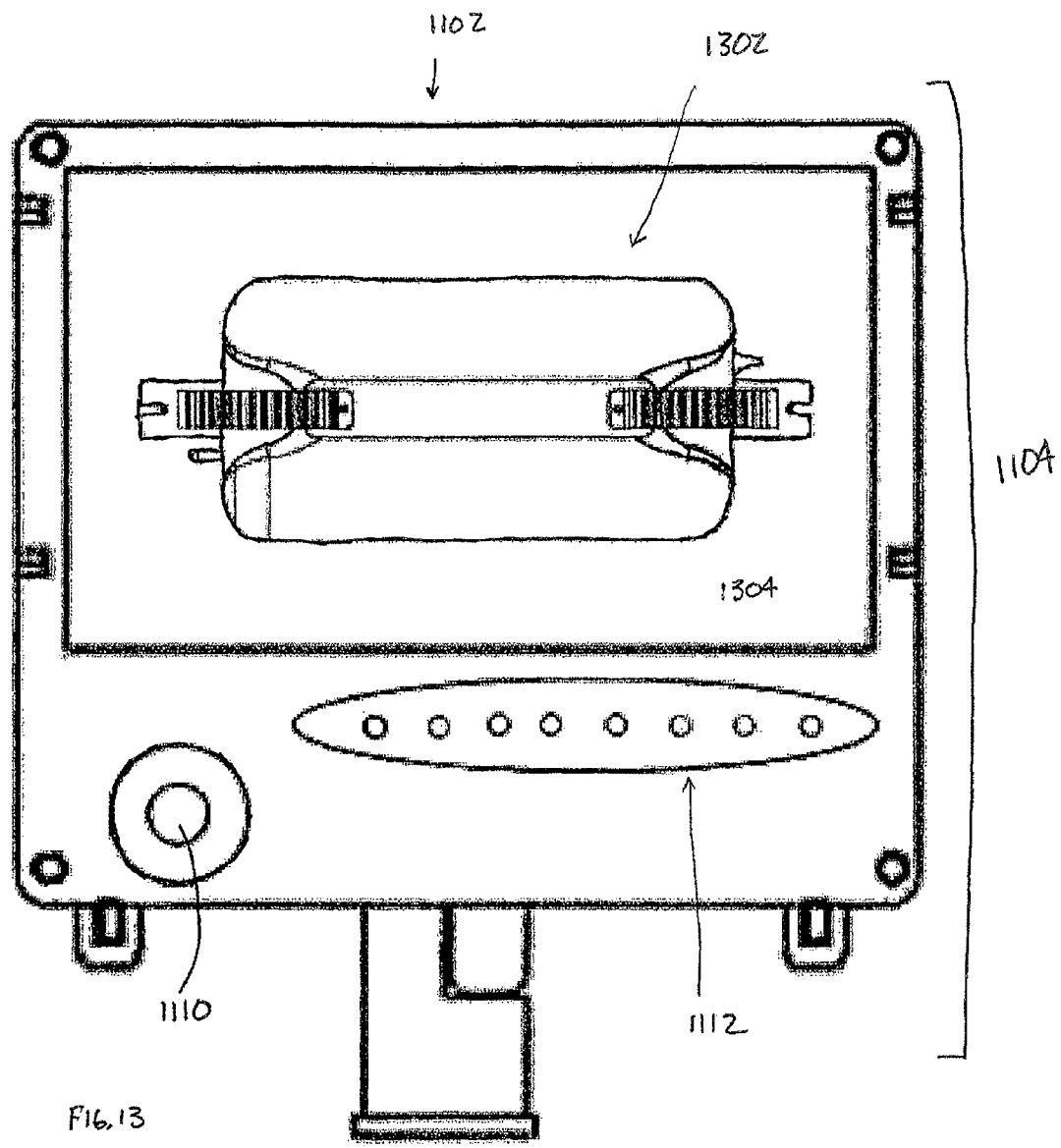
FIG. 13 is a bottom view of the FIG. 11 area light type fixture having a lens removed.

FIG. 13 is a bottom view of area light type fixture 1102. Lens 1206 is removed from the area light type fixture 1102 to reveal a first illuminant 1302 affixed to a surface 1304 of case 1104.

Figure 14:
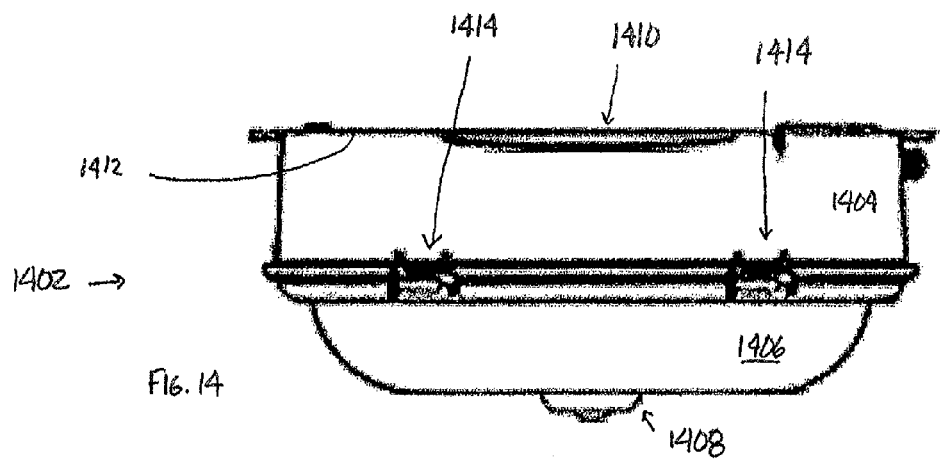
FIG. 14 a side view of the canopy type light fixture according to an embodiment of a bi-level hybrid light fixture.

FIG. 14 is a side view of another embodiment of a bi-level hybrid lighting device having a canopy type light fixture 1402 according to an embodiment of the present invention. Canopy type light fixture 1402 comprises a case 1404 and a lens 1406. Case 1404 comprises a rim 1412. Rim 1412 attaches to a secondary illuminant 1410. A sensor 1408 is affixed to lens 1406. Lens 1406 is removably attached to case 1404 by a hinged latch device 1414. In other embodiments, the lens 1406 removably attaches to the case 1404 via a removable fastener or compression fittings.

Figure 15:
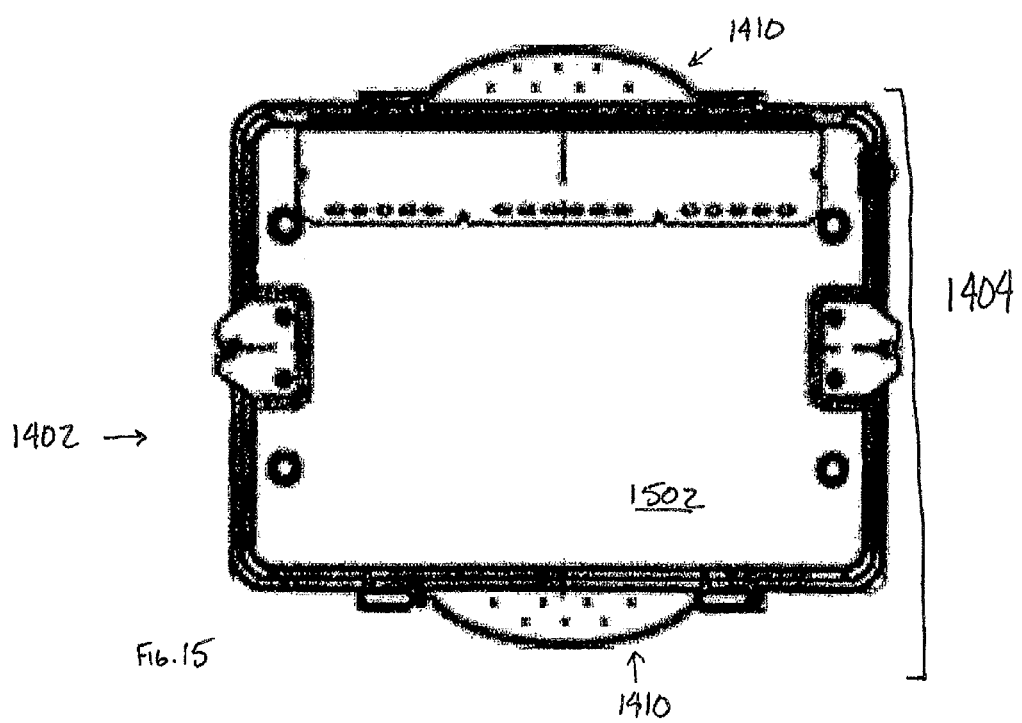
FIG. 15 is a bottom view of the FIG. 14 canopy type light fixture.

FIG. 15 is a top view of canopy type light fixture 1402. Case 1404 comprises a surface 1504. Surface 1504 may be removably attached to a mountable surface, such as a garage, canopy, parking structure, and adapted to received a power source to supply power to the bi-level hybrid lighting device.

Figure 16:
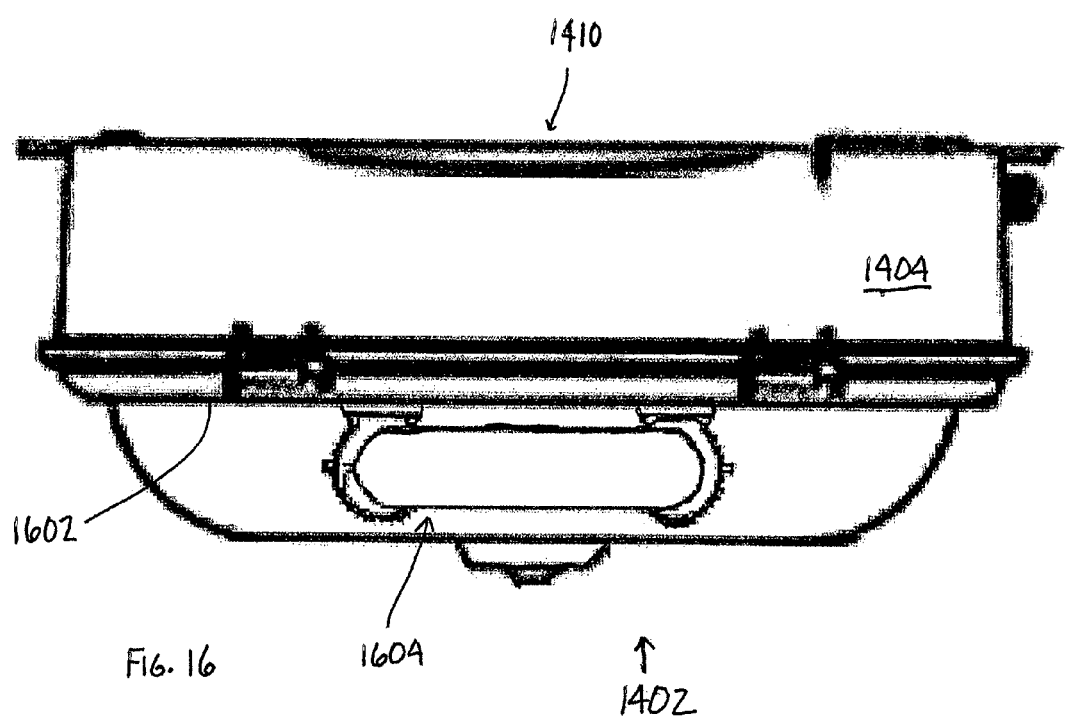
FIG. 16 is a side view of the FIG. 14 canopy type light fixture having a lens partially removed.

FIG. 16 is a side view of canopy type light fixture 1402, wherein lens 1406 is partially removed to reveal a first illuminant 1604. First illuminant 1604 is affixed to a surface 1602 of case 1404.

Figure 17:
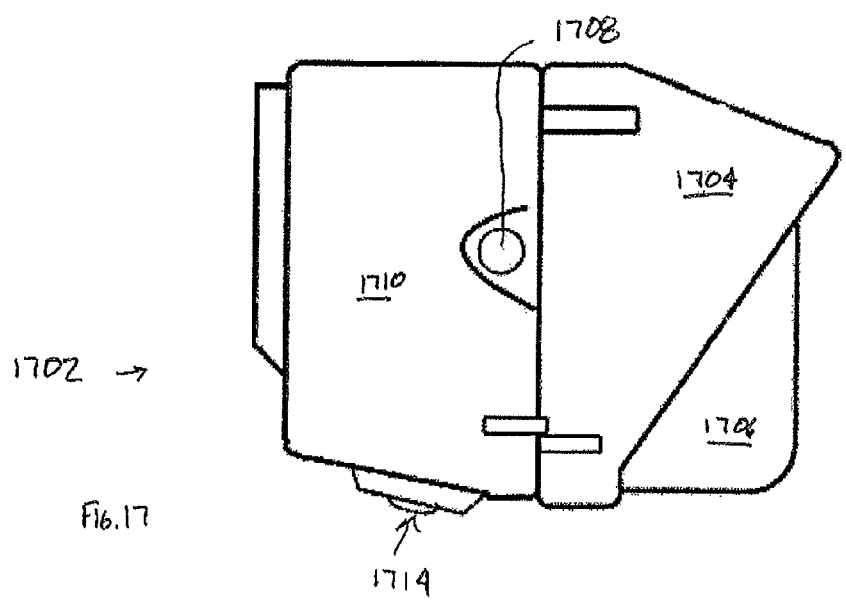
FIG. 17 a side view of the wall pack type light fixture according to an embodiment of a bi-level hybrid light fixture.

FIG. 17 is a side view of another embodiment of the bi-level hybrid lighting device having a wall pack type light fixture 1702 according to an embodiment of the present invention. Wall pack type fixture 1702 comprises a case 1704, a lens 1706, and a housing 1710. Case 1704 is removably attached to housing 1710, which are removably affixed via fasteners 1708. A sensor 1714 is attached to the housing 1710. In other embodiments, the sensor 1714 is attached to the case 1704.

Figure 18:
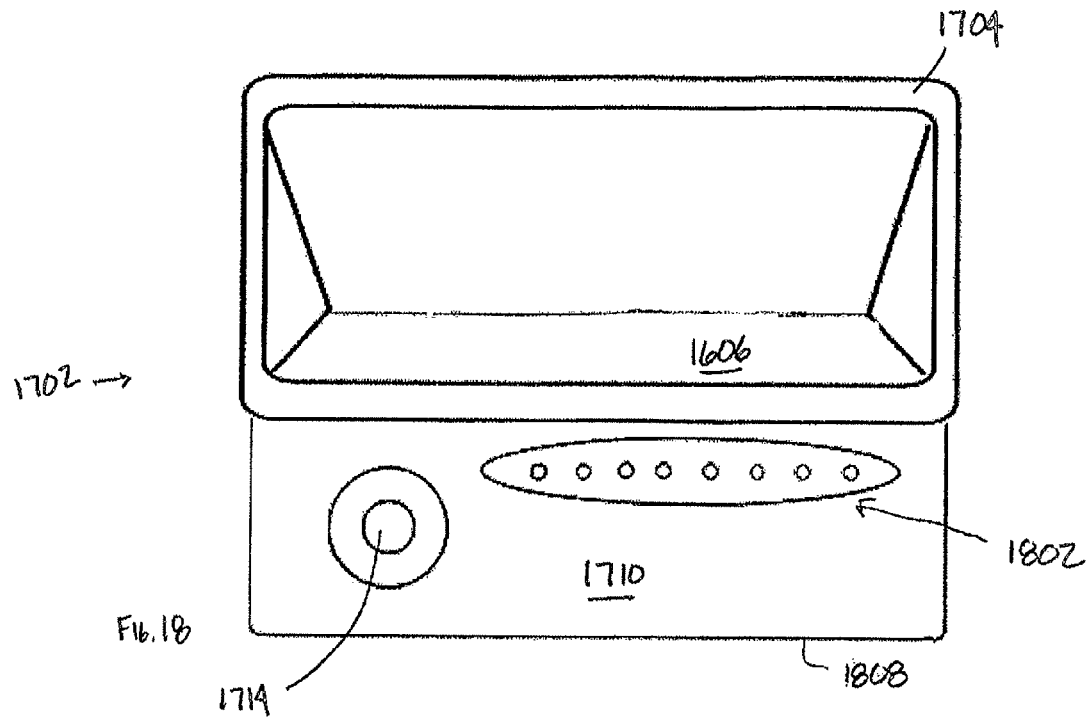
FIG. 18 is a bottom view of the FIG. 17 wall pack type light fixture.

FIG. 18 is a bottom view of wall pack type light fixture 1702. Case 1704 is adapted to receive a lens 1706. A secondary illuminant 1802 is affixed to housing 1710. Housing 1710 comprises a surface 1804, which may be removably attached to any mountable surface, such as a wall of a garage, house, parking structure, and adapted to receive a power source to supply power to the bi-level hybrid lighting device.

FIG. 19 is a bottom view of wall pack type light fixture 1702, where the lens 1706 is removed to reveal a first illuminant 1902 affixed to a surface 1904 of case 1704.

Figure 20:
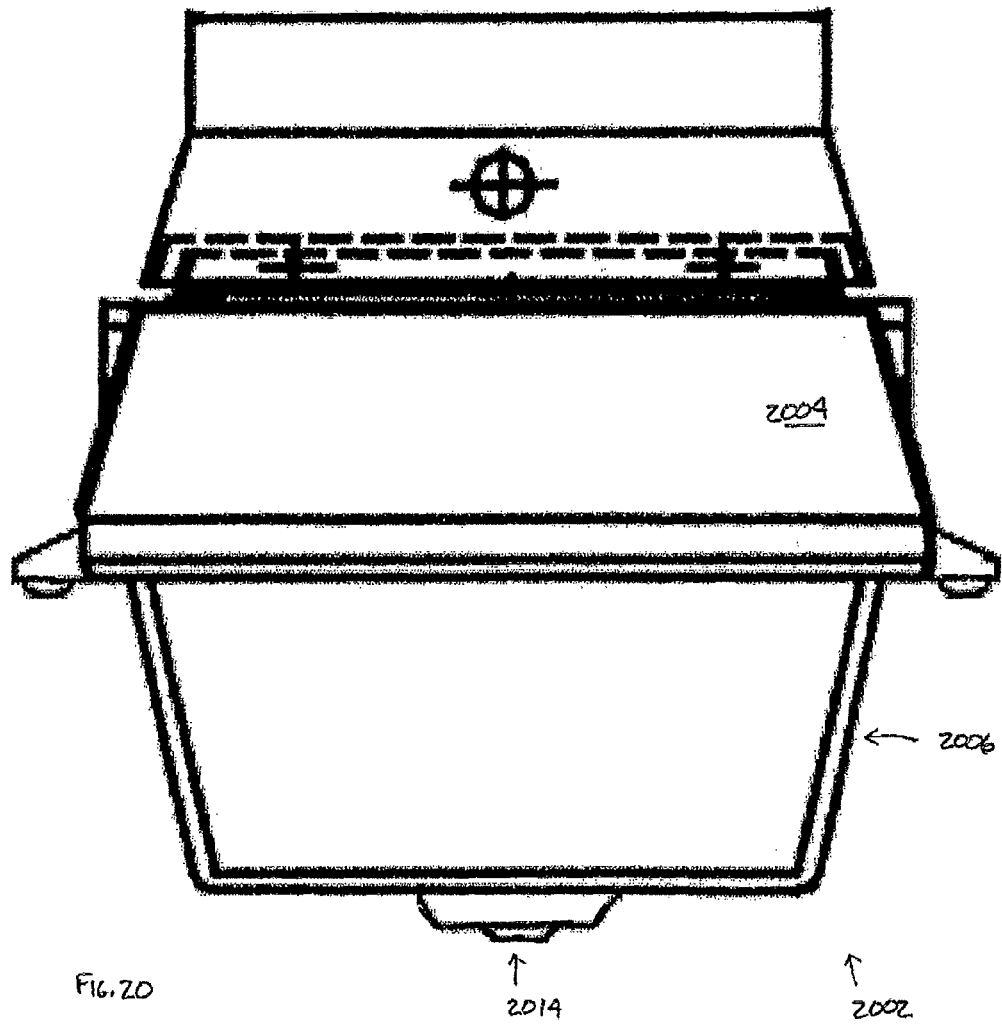
FIG. 20 is a side view of the garage type light fixture according to an embodiment of a bi-level hybrid light fixture.

FIG. 20 is a side view of another embodiment of a bi-level hybrid lighting device having a garage type light fixture 2002 according to an embodiment of the present invention. Garage type light fixture 2002 comprises a case 2004 and a lens 2006. Affixed to lens 2006 is a sensor 2014.

Figure 21:
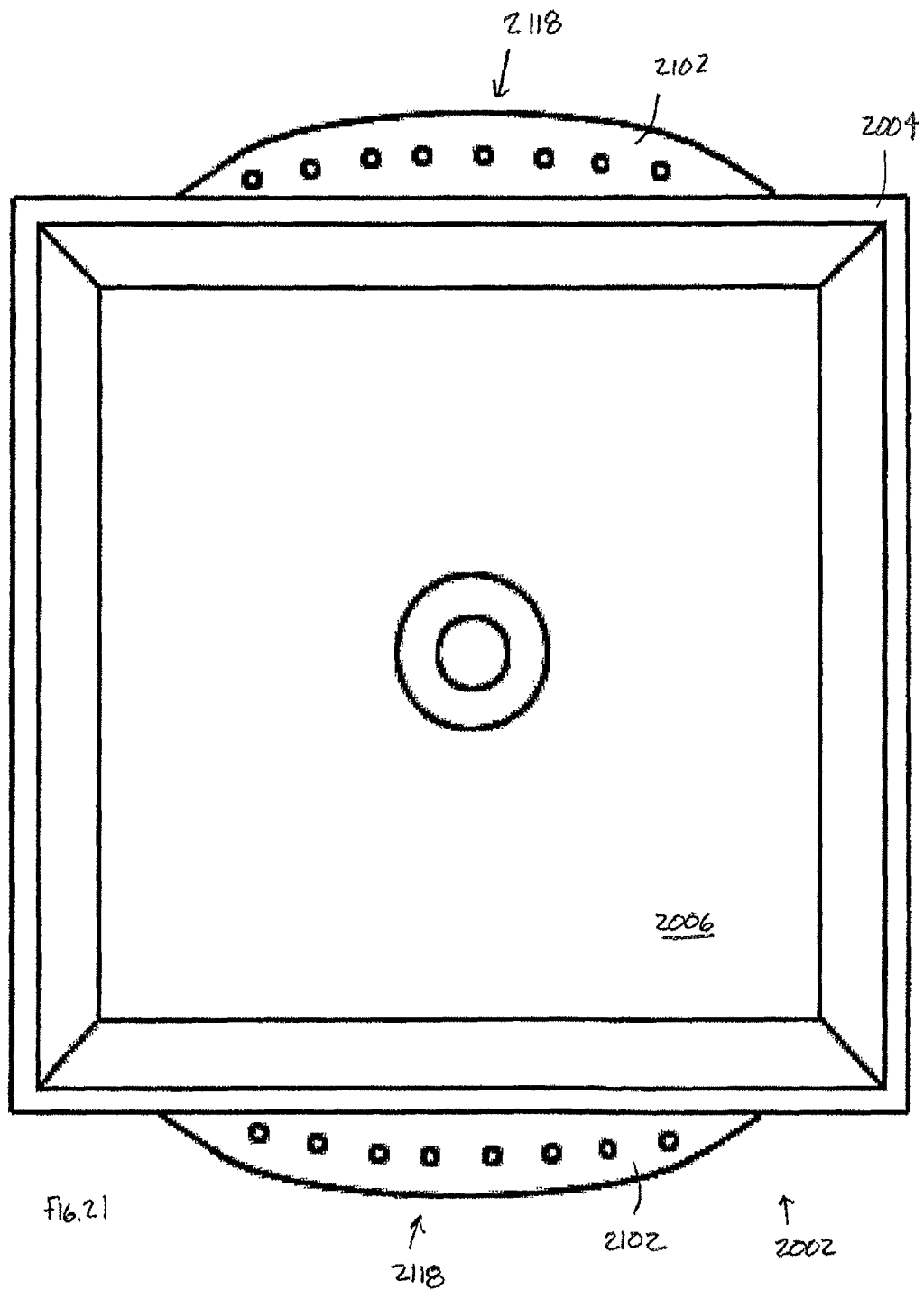
FIG. 21 is a bottom view of the FIG. 20 garage type light fixture.

FIG. 21 is a bottom view of garage type light fixture 2002 (FIG. 20). Lens 2006 is affixed to case 2004 by way of a twist-lock ring. In other embodiments, lens 2006 may be affixed to case 2004 by way of a fastener or compression fitting.

Case 2004 comprises a rim 2102 attached to or having attached thereto a plurality of secondary illuminants 2118. In other embodiments, a single secondary illuminant is used depending on the intensity and desired effects of the secondary illuminant.

Figure 22:
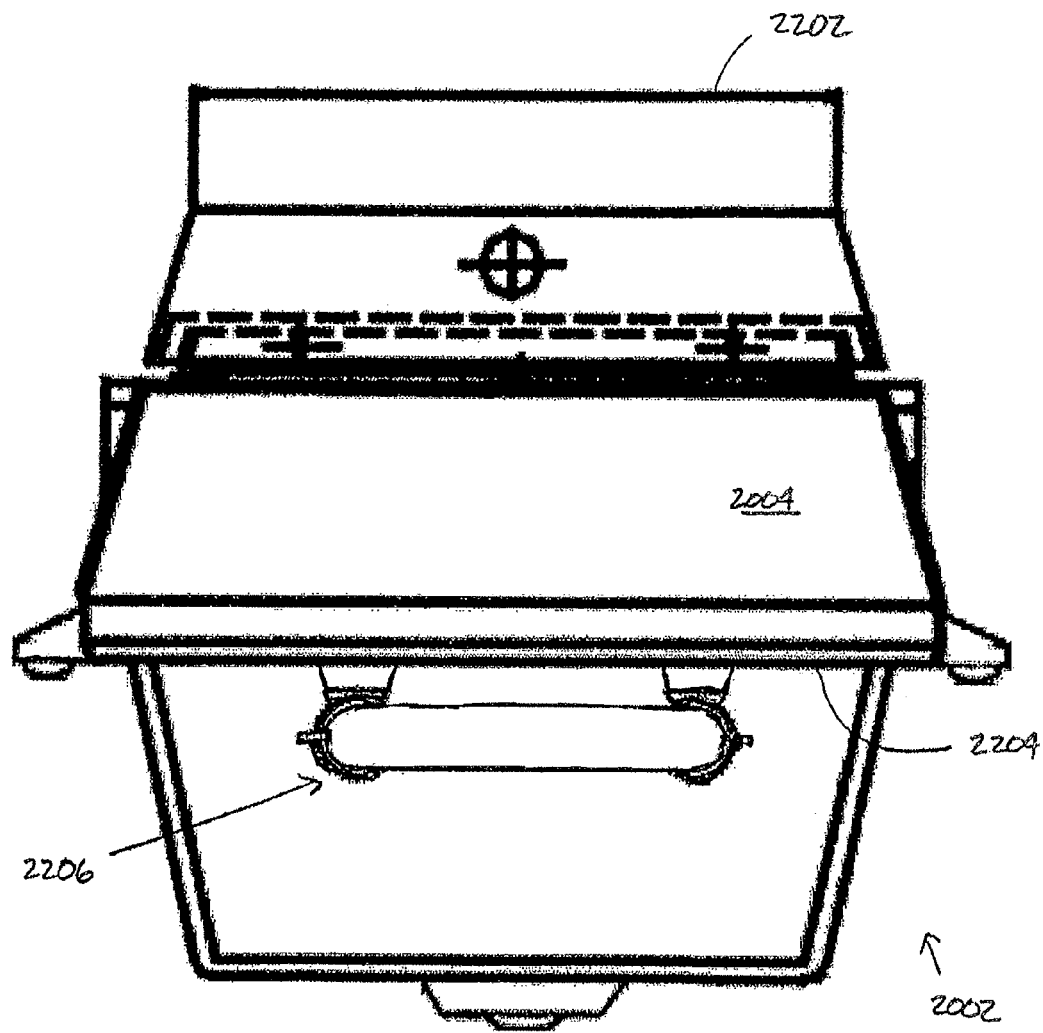
FIG. 22 is a side view of the FIG. 20 garage type light fixture having a lens partially removed.

FIG. 22 is a side view of garage type light fixture 2002 (FIG. 20), wherein lens 2006 is removed to reveal a first illuminant 2206 affixed to a surface 2204 of case 2004.

Garage type light fixture 2002 comprises a surface 2202. Surface 2202 removably attaches to a mountable surface, such as a garage, canopy, parking structure, and adapted to receive a power source to supply power to the first illuminant 2206 and secondary illuminants 2118.

Figure 23:
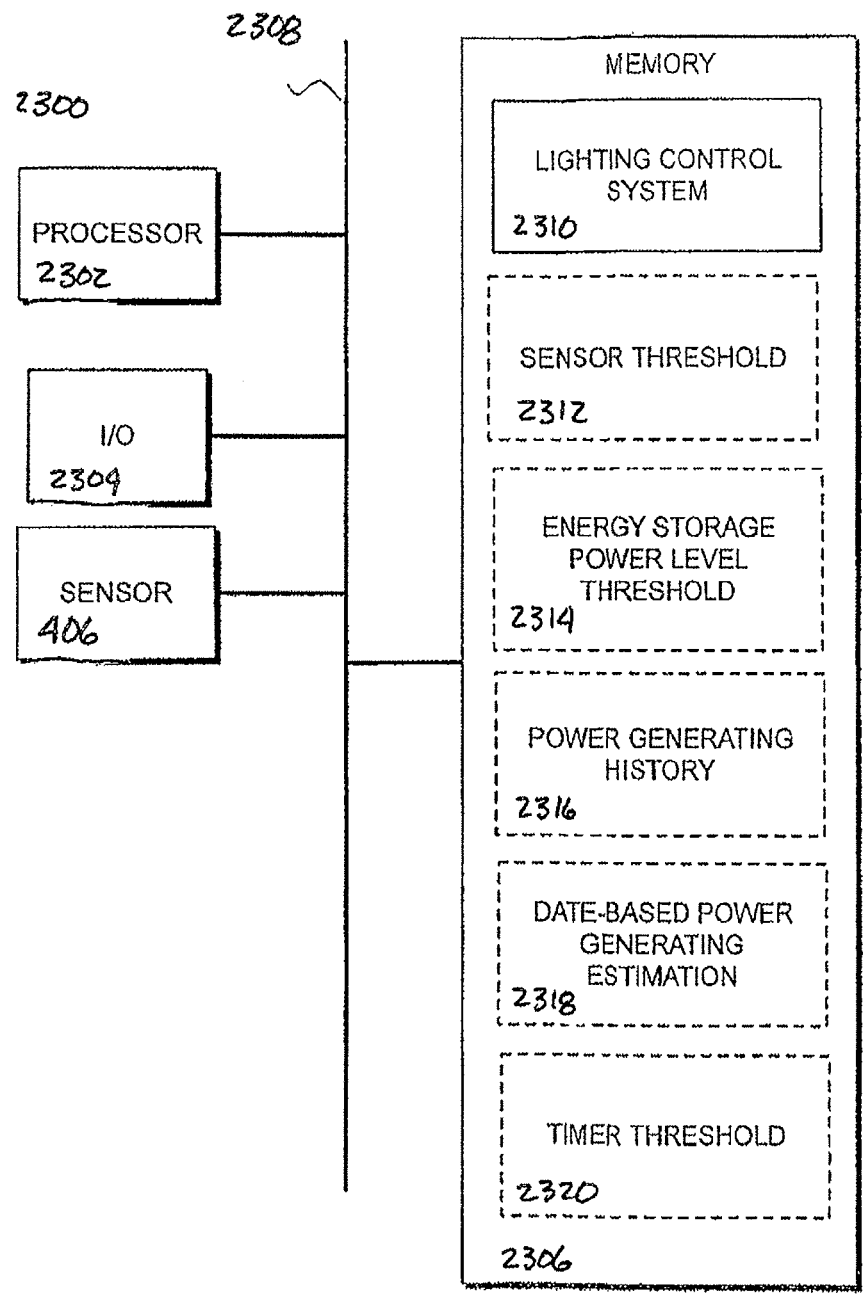
FIG. 23 is a high-level functional block diagram of a controller according to an embodiment.

FIG. 23 depicts a high-level functional block diagram of a controller 2300 usable in conjunction with an embodiment, e.g., as controller 2300 or as a controller integrated as part of a light fixture such as the shoe box, garage, wall pack, or walkway light fixtures. In one embodiment, controller 2300 is coupled to sensor 406 (FIG. 4), first illuminant 402 (FIG. 4) and secondary illuminant 118 (FIG. 1) to manage operation of the first illuminant 402 (FIG. 4) and secondary illuminant 118 (FIG. 1) based on pre-determined conditions detected by sensor 406 (FIG. 4).

Controller 2300 comprises a processor or controller-based device 2302, an input/output (I/O) device 2304, a memory 2306, and a sensor 406 each communicatively coupled with a bus 2008. Memory 2006 (which may also be referred to as a computer-readable medium) is coupled to bus 2008 for storing data and information and instructions to be executed by processor 2302. Memory 2306 also may be used for storing temporary variables or other intermediate information during execution of instructions to be executed by processor 2302. Memory 2306 may also comprise a read only memory (ROM) or other static storage device coupled to bus 2308 for storing static information and instructions for processor 2302. Memory 2306 may comprise static and/or dynamic devices for storage, e.g., optical, magnetic, and/or electronic media and/or a combination thereof.

I/O device 2304 may comprise a display, such as a cathode ray tube (CRT) or a flat panel display or other illuminating devices such as illuminated icons or pre-arranged light emitting diodes, for displaying information, alphanumeric and/or function keys for communicating information and command selections to the processor 2302, a cursor control device, such as a mouse, a trackball, or cursor direction keys for communicating direction information and command selections to the processor and for controlling cursor movement on the display, or a combination thereof. This input device typically has two degrees of freedom in two axes, a first axis (e.g., x) and a second axis (e.g., y) allowing the device to specify positions in a plane. In at least some embodiments, I/O device 2304 is optional.

Sensor 406 generates a motion and/or occupancy detection signal responsive to detection of motion and/or occupancy by living beings within a predetermined area adjacent first illuminant 402 and secondary illuminant 118. In at least some embodiments, sensor 406 is a motion sensor positioned to detect movement within the predetermined area. In at least some embodiments, sensor 406 is an occupancy sensor positioned to detect occupancy by living beings within the predetermined area. In at least some embodiments, sensor 406 generates radio frequency emissions, e.g., infrared and/or microwave or other emissions, toward the predetermined area and generates the detection signal in response to changes detected in return signals from the predetermined area. Sensor 406 generates the detection signal for use by lighting control system 2310 during execution by processor 2302.

Memory 2306 comprises a lighting control system 2310 according to one or more embodiments for determining illumination of the bi-level hybris lighting device 100 (FIG. 1). Lighting control system 2310 comprises one or more sets of instructions which, when executed by processor 2302, causes the processor to perform particular functionality. In at least some embodiments, lighting control system 2310 determines how long first illuminant 402 and/or secondary illuminant 118 should be illuminated based on at least signals, e.g., information and/or data, received from sensor 406 such as an occupancy and/or motion sensor, coupled to the controller.

In at least some further embodiments, lighting control system 2310 determines when and/or how long first illuminant 402 and/or secondary illuminant 118 should be illuminated based on a monitored power level of an energy storage device, monitored power generating patterns, e.g., with respect to one or both of solar panels and/or wind turbines, and/or a date-based information, or a combination thereof.

In at least one embodiment, lighting control system 2310 determines if first illuminant 402 and/or secondary illuminant 118 should be illuminated responsive to receipt of a motion/occupancy detection signal from sensor 406. Lighting control system 2310 determines if first illuminant 402 and/or secondary illuminant 118 should be illuminated based on comparing the detection signal value (if applicable) with a sensor threshold value 2312 stored in memory 2306. If the detection signal value meets or exceeds the sensor threshold value 2312, control system 2310 causes activation of first illuminant 402 and/or secondary illuminant 118.

In at least some embodiments, sensor threshold value 2312 may specify one or more different threshold values. In accordance with such an embodiment, if the detection signal exceeds a lowest threshold value and not a next higher threshold value, first illuminant 402 and/or secondary illuminant 118 may be activated at a reduced or dimmed illumination level. If the detection signal exceeds each of the threshold values, first illuminant 402 and/or secondary illuminant 118 may be activated at a full illumination level.

In at least some embodiments, lighting control system 2310 executes a timer function in conjunction with monitoring for the detection signal in order to dim the illumination level of first illuminant 402 and/or secondary illuminant 118 during periods of inactivity in the predetermined area adjacent the lighting device. For example, if the timer has exceeded a predetermined inactivity threshold value 2320 (stored in memory 2306), lighting control system 2310 causes first illuminant 402 and/or secondary illuminant 118 to reduce the illumination level to a dimmed level, e.g., a predetermined percentage of the full output level of the device. In at least some embodiments, lighting control system 2310 resets or restarts timer responsive to receipt of a detection signal from sensor 406.

In at least one embodiment, lighting control system 2310 determines how long first illuminant 402 and/or secondary illuminant 118 should be illuminated based on comparing an energy potential stored in an energy storage device with an energy storage power level threshold 2314 stored in memory 2306. In at least some embodiments, energy storage power level threshold 2314 comprises a set of values corresponding to different durations in which first illuminant 402 and/or secondary illuminant 118 may be illuminated. For example, at a first threshold level, controller 2300 may cause first illuminant 402 and/or secondary illuminant 118 to illuminate for 4 hours, at a second lower threshold level, the controller may cause the first illuminant 402 and/or secondary illuminant 118 to illuminate for 2 hours, etc. In at least some embodiments, energy storage power level threshold 2314 comprises a single value above which the energy storage power level must exceed in order for controller 2300 to cause the light source to illuminate. The energy storage power level threshold 2314 may be predetermined and/or user input to controller 2300.

In at least one embodiment, lighting control system 2310 determines how long first illuminant 402 and/or secondary illuminant 118 should be illuminated based on comparing a power generating history 2316 stored in memory 2306. Power generating history 2316 may comprise a single value or a set of values corresponding to a time and/or date based history of the power generated by one or both or each of solar panels and wind turbines. For example, lighting control system 2310 may apply a multi-day moving average to the power generating history of one or both or each of solar panels and wind turbines in order to determine the power generating potential for subsequent periods and estimate based thereon the amount of power which may be expended to illuminate first illuminant 402 and/or secondary illuminant 118 during the current period. In at least one embodiment, lighting control system 2310 applies a three (3) day moving average to the power generating history of one or both of solar panels and wind turbines.

In at least one embodiment, lighting control system 2310 determines how long first illuminant 402 and/or secondary illuminant 118 should be illuminated based on a date-based power generating estimation 2318 stored in memory 2306. For example, depending on a geographic installation location of bi-level hybrid lighting device 100 (FIG. 1), controller 2300 may determine the illumination of first illuminant 402 and/or secondary illuminant 118 based on a projected amount of daylight for the particular location, e.g., longer periods of darkness during winter in Polar locations as opposed to Equatorial locations. In at least some further embodiments, controller 2300 may be arranged to cause illumination of first illuminant 402 and/or secondary illuminant 118 for a predetermined period of time based on information from one or more of energy storage power level threshold 2314, power generating history 2316, and/or date-based power generating estimation 2318 and after termination of the predetermined period be arranged to cause illumination of the light source responsive to a signal from a motion sensor for a second predetermined period of time.

In at least some further embodiments, lighting control system 2310 determines when first illuminant 402 and/or secondary illuminant 118 should be illuminated based on receipt of a signal from an occupancy or traffic detector, e.g., a motion sensor operatively coupled with controller 2300.

In at least some embodiments, controller 2300 also comprises an electrical connection to a mains power supply. The mains power supply connection may be used as a primary source of power or coupled to solar panels, wind turbine, or energy storage device. In another embodiment, the mains power supply connection may be used to return power generated by first illuminant 402 and/or secondary illuminant 118 to a power supply grid. In at least some embodiments, the returned electric power may be returned for free or for a predetermined price.

In at least some embodiments, controller 2300 regulates the supply of electricity to first illuminant 402 and/or secondary illuminant 118. By regulating the supplied electricity, controller 2300 may prevent and/or minimize unexpected spikes or drops in the supplied electricity level to first illuminant 402 and/or secondary illuminant 118. In at least some embodiments, controller 2300 may also direct from which component first illuminant 402 and/or secondary illuminant 118 receives electricity, e.g., energy storage device or directly from wind turbine, solar panels, etc.

In at least some embodiments, controller 2300 also comprises a light sensor to determine if a predetermined threshold has been met in order to transfer electricity to first illuminant 402 and/or secondary illuminant 118 to cause the light source to activate and generate illumination. In at least some alternate embodiments, first illuminant 402 and/or secondary illuminant 118 comprises the light sensor. The light sensor is a switch controlled by a detected light level, e.g., if the light level is below a predetermined threshold level, the switch is closed and electricity flows to first illuminant 402 and/or secondary illuminant 118.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A lighting fixture system, comprising:
   a first illuminant;
   a secondary illuminant; and
   a sensor configured to detect a predetermined condition,
   the sensor being coupled to the first illuminant and the secondary illuminant, the first illuminant and the secondary illuminant comprising different light sources, the sensor configured to cause modulation of the first illuminant and the secondary illuminant in response to detection of the pre-determined condition.

2. The lighting fixture system as claimed in claim 1, wherein the first illuminant is an induction based light source.

3. The lighting fixture system as claimed in claim 1, wherein the secondary illuminant is an LED based light source.

4. The lighting fixture system as claimed in claim 1, wherein the secondary illuminant is configured to generate visible light at a wavelength greater than 480 nanometers.

5. The lighting fixture system as claimed in claim 1, wherein the sensor is an occupancy sensor.

6. The lighting fixture system as claimed in claim 1, wherein the first illuminant is configured to generate a color temperature different from the secondary illuminant.

7. The lighting fixture system as claimed in claim 1, wherein the secondary illuminant is an amber LED.

8. The lighting fixture system as claimed in claim 1 further comprising a controller coupled between the sensor and the first illuminant and the second illuminant.

9. The lighting fixture system as claimed in claim 1 further comprising a communication system, where the communication system is electrically coupled to the first illuminant and the secondary illuminant and the communication system is configured to modulate between the first illuminant and the secondary illuminant based on a pre-determined condition.

10. The lighting fixture system as claimed in claim 1, wherein the secondary illuminant is configured to generate visible light at a wavelength that reduces the impact of biological disturbances.

11. A lighting fixture system, comprising:
    a first illuminant being an induction based light source;
    a secondary illuminant being an LED based light source; and
    a sensor configured to detect a predetermined condition,
    the sensor being coupled to the first illuminant and the secondary illuminant, the sensor configured to cause modulation of the first illuminant and the secondary illuminant in response to detection of the pre-determined condition.

12. The lighting fixture system as claimed in claim 11, wherein the secondary illuminant is configured to generate visible light at a wavelength greater than 480 nanometers.

13. The lighting fixture system as claimed in claim 11, wherein the first illuminant is configured to generate a color temperature different from the secondary illuminant.

14. The lighting fixture system as claimed in claim 11, wherein the secondary illuminant is configured to generate visible light at a wavelength that reduces the impact of biological disturbances.

15. A lighting fixture system, comprising:
    a first illuminant being an induction based light source;
    a secondary illuminant being an LED based light source;
    a sensor configured to detect a predetermined condition,
    the sensor being coupled to the first illuminant and the secondary illuminant, the first illuminant and the secondary illuminant comprising different light sources, the sensor configured to cause modulation of the first illuminant and the secondary illuminant in response to detection of the pre-determined condition; and
    a communication system, where the communication system is electrically coupled to the first illuminant and secondary illuminant and the communication system is configured to modulate between the first illuminant and the secondary illuminant based on a pre-determined condition.

16. The lighting fixture system as claimed in claim 15, wherein the secondary illuminant is configured to generate visible light at a wavelength greater than 480 nanometers.

17. The lighting fixture system as claimed in claim 15, wherein the first illuminant is configured to generate a color temperature different from the secondary illuminant.

18. The lighting fixture system as claimed in claim 15, wherein the secondary illuminant is an amber LED.

19. The lighting fixture system as claimed in claim 15, wherein the secondary illuminant is configured to generate visible light at a wavelength that reduces the impact of biological disturbances.

* * * * *